US010455366B1

(12) United States Patent
Wyllie et al.

(10) Patent No.: US 10,455,366 B1
(45) Date of Patent: Oct. 22, 2019

(54) CARD LOCATING TOOL

(71) Applicant: Bank of America Corporation, Charlotte, NC (US)

(72) Inventors: Graham Marshall Wyllie, Charlotte, NC (US); Christopher Lamont Rice, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 0 days.

(21) Appl. No.: 16/287,741

(22) Filed: Feb. 27, 2019

(51) Int. Cl.
H04W 4/029 (2018.01)
H04W 4/20 (2018.01)

(52) U.S. Cl.
CPC ............ H04W 4/029 (2018.02); H04W 4/20 (2013.01)

(58) Field of Classification Search
CPC .................................. H04W 4/029; H04W 4/20
See application file for complete search history.

(56) References Cited

U.S. PATENT DOCUMENTS

| 9,640,060 | B2 | 5/2017 | Marra et al. |
| 9,858,603 | B2 | 1/2018 | Lamba et al. |
| 10,055,968 | B2* | 8/2018 | Marra ................ G06F 16/951 |
| 2007/0226086 | A1* | 9/2007 | Bauman ............ G06Q 10/087 705/28 |
| 2015/0227903 | A1 | 8/2015 | Votaw et al. |
| 2015/0302393 | A1 | 10/2015 | Poole et al. |
| 2017/0161724 | A1 | 6/2017 | Lau |
| 2017/0374515 | A1* | 12/2017 | Cox ...................... G08B 21/24 |
| 2019/0188984 | A1* | 6/2019 | McLaughlin ...... G08B 13/2462 |

OTHER PUBLICATIONS

U.S. Appl. No. 10/055,968, filed Aug. 21, 2018, Marra et al.

* cited by examiner

Primary Examiner — Brandon J Miller
(74) Attorney, Agent, or Firm — Michael A. Springs

(57) ABSTRACT

A memory stores a list of identifiers. A processor receives a notification from a card user indicating that the card user is missing a card. The card includes a transmitter configured to broadcast a transmission including a card identifier. The processor adds the card identifier to the list of identifiers. The processor receives messages from mobile devices that received the transmission, including the card identifier from the transmission and locations of the mobile devices. In response to receiving the messages, the processor determines that the list of identifiers contains the card identifier. The processor further determines, based on the locations of the mobile devices, a location of the card and sends the location of the card to a mobile device of the card user.

20 Claims, 5 Drawing Sheets

CARD LOCATING TOOL

TECHNICAL FIELD

This disclosure relates generally to locating lost property, in particular, lost payment cards, access cards and/or identification cards.

BACKGROUND

The average individual carries numerous cards in his/her wallet or purse. Examples of such cards include: (1) cards that contain personal, identifying information, such as a driver's license, social security card, or health care card; (2) cards that provide access to the individual's payment accounts, such as credit and debit cards; and (3) cards that provide building access, such as an apartment key card. Even though such cards are likely highly valuable to the individuals who hold them, due to their small size, they are easily lost or misplaced.

SUMMARY OF THE DISCLOSURE

The average individual carries numerous cards in his/her wallet or purse. Examples of such cards include: (1) cards that contain personal, identifying information, such as a driver's license, social security card, or health care card; (2) cards that provide access to the individual's payment accounts, such as credit and debit cards; and (3) cards that provide building access, such as an apartment key card. Even though such cards are likely highly valuable to the individuals who hold them, due to their small size, they are easily lost or misplaced.

When a card is lost, an individual can do little more than search for it (by retracing his or her steps) or wait and hope that a good Samaritan will find it and return it. If the individual does not locate the card within a relatively short period of time, he/she will likely need to take further action, such as contacting the card issuer, cancelling the card, and/or requesting a replacement card. In the case of an identification card or payment card, an individual may need to take additional actions to protect himself/herself from fraud and/or identity theft, such as monitoring his/her payment account statements for unusual charges and/or contacting credit rating agencies and requesting that they inform the individual if any new applications for credit are attempted using his/her information.

This disclosure contemplates a card locating tool that addresses one or more of the above issues. In combination with cards equipped to transmit an identifier, the tool uses the mobile devices that people now routinely carry to assist in searching for missing cards. When a user loses a registered card, he/she can send a notification to the card locating tool, which then adds the card's identifier to a list of missing cards. When phones nearby to the missing card receive the transmission broadcasted by the missing card and containing its identifier, they send this identifier along with their global positioning system (GPS) location to the tool. Using the GPS locations it receives, the card locating tool determines a location or range of locations for the missing card, which it sends to the user. In this manner, certain embodiments enable a user to locate a missing card. Certain embodiments of the card locating tool are described below.

According to one embodiment, an apparatus includes a memory and a hardware processor communicatively coupled to the memory. The memory stores a list of identifiers. The processor receives a notification from a card user. The notification indicates that the card user is missing a card. The card includes a transmitter configured to broadcast a transmission including a card identifier. The processor additionally adds the card identifier to the list of identifiers. The processor further receives a first message from a first mobile device that received the transmission. The first message includes the card identifier from the transmission and a first location of the first mobile device. The processor further receives a second message from a second mobile device that received the transmission. The second message includes the card identifier from the transmission and a second location of the second mobile device. The processor further receives a third message from a third mobile device that received the transmission. The third message includes the card identifier from the transmission and a third location of the third mobile device. In response to receiving the first message, the second message, and the third message, the processor determines that the list of identifiers contains the card identifier. The processor further determines, based on the first location, the second location, and the third location, a location of the card. The processor additionally sends the location of the card to a fourth mobile device of the card user.

According to another embodiment, a method includes receiving a notification from a card user. The notification indicates that the card user is missing a card. The card includes a transmitter configured to broadcast a transmission including a card identifier. The method further includes adding the card identifier to a list of identifiers stored in a memory. The method also includes receiving a first message from a first mobile device that received the transmission. The first message includes the card identifier from the transmission and a first location of the first mobile device. The method also includes receiving a second message from a second mobile device that received the transmission. The second message includes the card identifier from the transmission and a second location of the second mobile device. The method further includes receiving a third message from a third mobile device that received the transmission. The third message includes the card identifier from the transmission and a third location of the third mobile device. In response to receiving the first message, the second message, and the third message the method also includes determining that the list of identifiers contains the card identifier. The method further includes determining, based on the first location, the second location, and the third location, a location of the card, and sending the location of the card to a fourth mobile device of the card user.

According to a further embodiment, a system includes a storage element and a processing element communicatively coupled to the storage element. The storage element is operable to store a list of identifiers. The processing element is operable to receive a notification from a card user. The notification indicates that the card user is missing a card. The card includes a transmitter configured to broadcast a transmission including a card identifier. The processing element is further operable to add the card identifier to the list of identifiers. The processing element is also operable to receive a first message from a first mobile device that received the transmission. The first message includes the card identifier from the transmission, a first strength of the transmission, and a first location of the first mobile device. The processing element is further operable to receive a second message from a second mobile device that received the transmission. The second message includes the card identifier from the transmission, a second strength of the transmission, and a second location of the second mobile device. The processing element is additionally operable to receive a third message from a third mobile device that received the transmission. The third message includes the card identifier from the transmission, a third strength of the transmission, and a third location of the third mobile device. In response to receiving the first message, the second message, and the third message, the processing element is operable to determine that the list of identifiers contains the card identifier. The processing element is further operable to determine, based on the first location, the second location, the third location, the first strength, the second strength, and the third strength, a location of the card. The processing element is additionally operable to send the location of the card to a fourth mobile device of the card user.

Certain embodiments provide one or more technical advantages. For example, an embodiment enables a user to locate a missing card. As another example, an embodiment prevents fraud by protecting an individual from identity theft resulting from a lost identification card. As a further example, an embodiment enhances the security of a user's accounts, associated with payment cards he/she carries. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages are best understood by referring to FIGS. 1 through 5 of the drawings, like numerals being used for like and corresponding parts of the various drawings.

The average individual carries numerous cards in his/her wallet or purse. Examples of such cards include: (1) cards that contain personal, identifying information, such as a driver's license, social security card, or health care card; (2) cards that provide access to the individual's payment accounts, such as credit and debit cards; and (3) cards that provide building access, such as an apartment key card. Even though such cards are likely highly valuable to the individuals who hold them, due to their small size, they are easily lost or misplaced.

When a card is lost, an individual can do little more than search for it (by retracing his or her steps) or wait and hope that a good Samaritan will find it and return it. If the individual does not locate the card within a relatively short period of time, he/she will likely need to take further action, such as contacting the card issuer, cancelling the card, and/or requesting a replacement card. In the case of an identification card or payment card, an individual may need to take additional actions to protect himself/herself from fraud and/or identity theft, such as monitoring his/her payment account statements for unusual charges and/or contacting credit rating agencies and requesting that they inform the individual if any new applications for credit are attempted using his/her information.

This disclosure contemplates a card locating tool that addresses one or more of the above issues. In combination with cards equipped to transmit an identifier, the tool uses the mobile devices that people now routinely carry to assist in searching for missing cards. When a user loses a registered card, he/she can send a notification to the card locating tool, which then adds the card's identifier to a list of missing cards. When phones nearby to the missing card receive the transmission broadcasted by the missing card and containing its identifier, they send this identifier along with their global positioning system (GPS) location to the tool. Using the GPS locations it receives, the card locating tool determines a location or range of locations for the missing card, which it sends to the user. In this manner, certain embodiments enable a user to locate a missing card. The card locating tool will be described in more detail using FIGS. 1 through 5.

Figure 1:
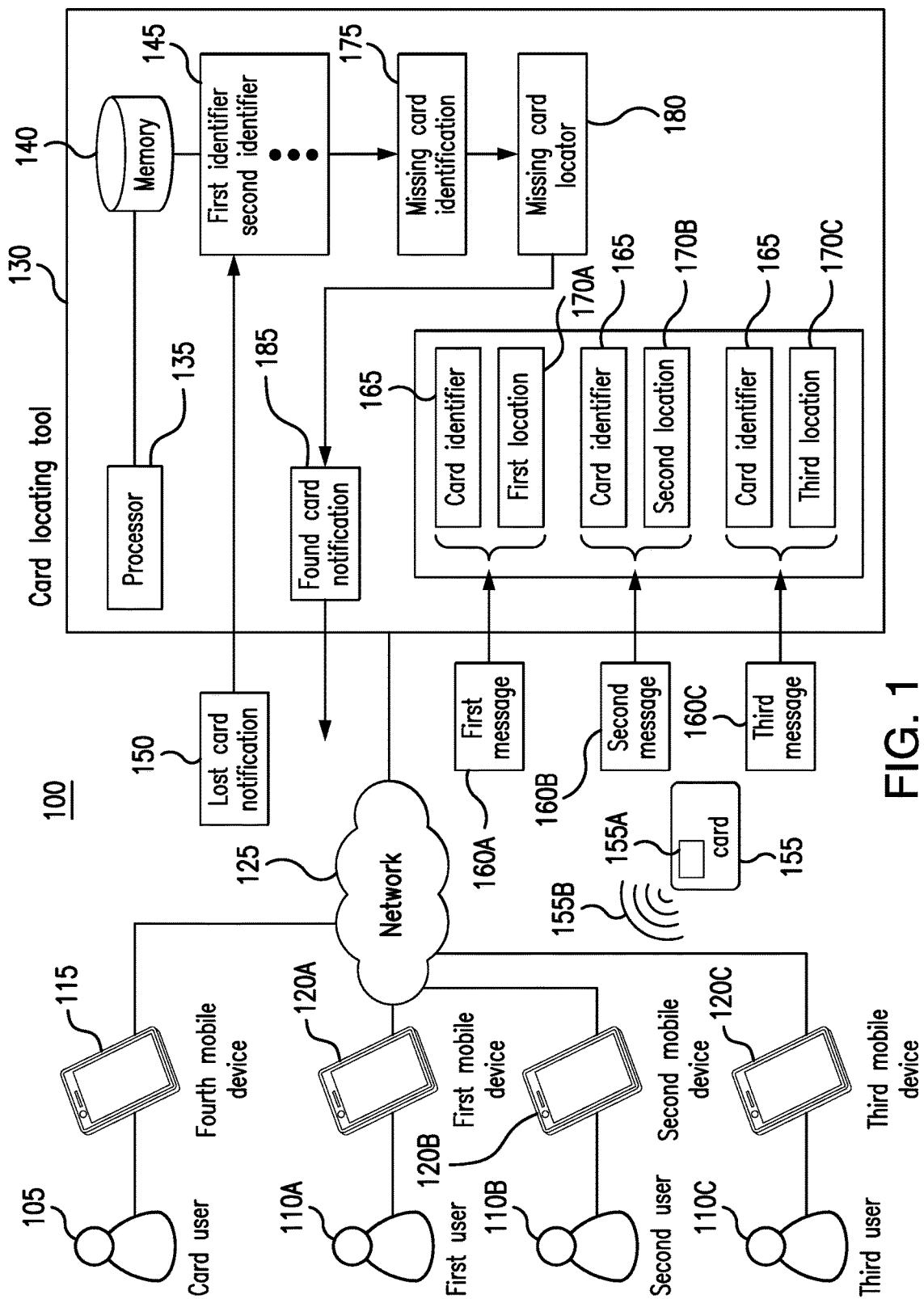
FIG. 1 illustrates an example system.

FIG. 1 illustrates an example system 100. As seen in FIG. 1, system 100 includes one or more first mobile devices 120A, one or more second mobile devices 120B, one or more third mobile devices 120C, one or more fourth mobile devices 115, a network 125, one or more missing cards 155, and a card locating tool 130. Generally, card locating tool 130 receives a notification 150 from card user 105 indicating that card user 105 has lost/misplaced his/her card 155. Missing card 155 is equipped with a transmitter 155A, which broadcasts a transmission 155B containing a card identifier assigned to card 155. Card locating tool 130 then adds the identifier assigned to card 155 to a list of missing cards. Card locating tool 130 then receives messages from enabled mobile devices that have received transmission 155B from missing card 155, where the messages include both the card identifier and the GPS location of the enabled mobile devices. Card locating tool 130 then uses the GPS locations to determine a location/range of locations for missing card 155, which card locating tool 130 sends to fourth mobile device 115 belonging to card user 105.

First mobile device 120A, second mobile device 120B, and third mobile device 120C are enabled mobile devices that can receive transmissions 155B from missing cards 155 containing card identifiers. For example, first mobile device 120A, second mobile device 120B, and third mobile device 120C may contain software designed to enable the devices to recognize and receive transmissions 155, and to extract the identifiers from transmissions 155. In certain embodiments, such software may take the form of a mobile application. Once first mobile device 120A, second mobile device 120B, and third mobile device 120C receive a transmission 155 containing an identifier, they are also able to transmit their GPS locations along with this identifier to card locating tool 130 over network 125.

Fourth mobile device 115 is used by card user 105 to send a notification 150 to card locating tool 130 indicating that user 105 cannot locate card 155. Fourth mobile device 115 is also used to receive a notification 185 from card locating tool 130 containing a location/range of locations for missing card 155.

First mobile device 120A, second mobile device 120B, third mobile device 120C, and fourth mobile device 115 include any appropriate device for communicating with components of system 100 over network 125. For example, first mobile device 120A, second mobile device 120B, third mobile device 120C, and fourth mobile device 115 may be a mobile phone, a laptop, a tablet, and/or an automated assistant. This disclosure contemplates first mobile device 120A, second mobile device 120B, third mobile device 120C, and fourth mobile device 115 being any appropriate portable device for sending and receiving communications over network 125. As an example, and not by way of limitation, first mobile device 120A, second mobile device 120B, third mobile device 120C, and fourth mobile device 115 may be a laptop, a wireless or cellular telephone, an electronic notebook, a personal digital assistant, a tablet, or any other device capable of receiving, processing, storing, and/or communicating information with other components of system 100. First mobile device 120A, second mobile device 120B, third mobile device 120C, and/or fourth mobile device 115 may also include a user interface, such as a display, a microphone, keypad, or other appropriate terminal equipment usable by card user 105, first user 110A, second user 110B, and/or third user 110C. In some embodiments, an application executed by first mobile device 120A, second mobile device 120B, third mobile device 120C and/or fourth mobile device 115 may perform the functions described herein.

Network 125 facilitates communication between and amongst the various components of system 100. This disclosure contemplates network 125 being any suitable network operable to facilitate communication between the components of system 100. Network 125 may include any interconnecting system capable of transmitting audio, video, signals, data, messages, or any combination of the preceding. Network 125 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Missing card 155 is equipped with a transmitter 155A capable of broadcasting a transmission 155B consisting of a card identifier assigned to card 155. This disclosure contemplates that transmitter 155A can be any type of electronic device, equipped with an antenna, and capable of generating transmission 155B. In certain embodiments, transmitter 155A is a radio-frequency identification (RFID) transmitter. In further embodiments, transmitter 155A is a Bluetooth transmitter. In certain embodiments, transmitter 155B is a passive transmitter, powered by electromagnetic waves generated externally of the transmitter. Such embodiments are described in further detail below, in the discussion of FIGS. 4A and 4B. In further embodiments, transmitter 155B is an active transmitter, powered by a power source within or coupled to transmitter 155B, such than transmitter 155B can produce transmission 155A automatically.

As seen in FIG. 1, card locating tool 130 includes a processor 135 and a memory 140. This disclosure contemplates processor 135 and memory 140 being configured to perform any of the functions of card locating tool 130 described herein. Generally, card locating tool 130 performs missing card identification 175, in which it determines that card identifier 165 contained in first message 160A received from first mobile device 120A, second message 160B received from second mobile device 120B, and third message 160C received from third mobile device 120C, is among the card identifiers in the list of missing card identifiers 145 stored in memory 140, and determines a location/range of locations for missing card 155 using missing card locator component 180.

In certain embodiments, card locating tool 130 transmits those card identifiers stored in the list of missing card identifiers 145 to enabled mobile devices including first mobile device 120A, second mobile device 120B, and third mobile device 120C. In such embodiments, when card locating tool 130 receives first message 160A, second message 160B, and third message 160C, each containing card identifier 165, card locating tool 130 performs missing card identification 175 to determine to which missing card identifier, stored in the list of missing card identifiers 145, card identifier 165 corresponds. By determining to which missing card identifier, stored in the list of missing card identifiers 145, card identifier 165 corresponds, card locating tool 130 is able to determine the card user 105 for whom missing card 155 has been located.

In certain embodiments, card locating tool 130 only transmits those missing card identifiers, stored in the list of missing card identifiers 145, to those enabled mobile devices, including first mobile device 120A, second mobile device 120B, and third mobile device 120C, that are located in the same geographic region as card user 105 was located when he/she lost his/her card 155. In certain such embodiments, card locating tool 130 may increase the size of this geographic region if no enabled mobile devices located within the initial geographic region receive transmission 155B from missing card 155 within a set period of time. For example, the initial geographic region may consist of a circular region of radius one mile from where card user 105 lost his/her card 155. If no enabled mobile devices, such as first mobile device 120A, second mobile device 120B, and/or third mobile device 120C, located within this region, are able to detect transmission 155B from missing card 155 within fifteen minutes, card locating tool may additionally send the identifier assigned to missing card 155 to all enabled mobile devices located within the same city as user 105 was located when user 105 lost his/her card 155. This may be desirable as it helps to conserve system resources, by only sending missing card identifiers to those mobile devices that are most likely within the transmission range of missing card 155.

In further embodiments, first mobile device 120A transmits first message 160A to card locating tool 130 any time first mobile device 120A receives a transmission 155B from a card 155. Similarly, second mobile device 120B transmits second message 160B to card locating tool 130 any time second mobile device 120B receives a transmission 155B from a card 155, and third mobile device 120C transmits third message 160C to card locating tool 130 any time third mobile device 120C receives a transmission 155B from a card 155. In such embodiments, first message 160A, second message 160B, and third message 160C may contain card identifiers 165 assigned to cards 155 which have not been identified by card users 105 as missing. Therefore, in such embodiments, card locating tool 130 performs missing card identification 175 to determine if card identifier 165 corresponds to a missing card 155. If missing card identification 175 determines that card identifier 165 does not correspond to a missing card 155, missing card locator component 180 is not invoked. Transmitting messages to card locating tool 130 any time an enabled mobile device receives a transmission 155B from a card 155 may be desirable if card locating tool 130 is further configured to store such messages in memory 140 (or, alternatively, in an external database). Then, when a user 105 sends a lost card notification 150 to card locating tool 130, card locating tool 130 can search memory 140 to determine the last known location of missing card 155. This last known location can then be sent to card user 105. In order to save storage resources, in certain such embodiments, card locating tool 130 periodically purges the messages it has received from enabled mobile devices and has stored in memory 140 (or alternatively in an external database).

Processor 135 is any electronic circuitry, including, but not limited to microprocessors, application specific integrated circuits (ASIC), application specific instruction set processor (ASIP), and/or state machines, that communicatively couples to memory 140 and controls the operation of card locating tool 130. Processor 135 may be 8-bit, 16-bit, 32-bit, 64-bit or of any other suitable architecture. Processor 135 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 135 may include other hardware and software that operates to control and process information. Processor 135 executes software stored on memory to perform any of the functions described herein. Processor 135 controls the operation and administration of card locating tool 130 by processing information received from network 125, first mobile device(s) 120A, second mobile device(s) 120B, third mobile device(s) 120C, fourth mobile device(s) 115, and memory 140. Processor 135 may be a programmable logic device, a microcontroller, a microprocessor, any suitable processing device, or any suitable combination of the preceding. Processor 135 is not limited to a single processing device and may encompass multiple processing devices.

Memory 140 may store, either permanently or temporarily, data, operational software, or other information for processor 135. Memory 140 may include any one or a combination of volatile or non-volatile local or remote devices suitable for storing information. For example, memory 140 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 140, a disk, a CD, or a flash drive. In particular embodiments, the software may include an application executable by processor 135 to perform one or more of the functions described herein.

Memory 140 also stores a list of identifiers 145 containing those card identifiers assigned to cards 155 that card users 105 have identified to card locating tool 130 as missing. In certain embodiments, for each identifier in the list of identifiers 145 memory 140 also stores the identity of card user 105. In further embodiments, memory 140 also stores a list of all card users 105 and the identifiers associated with their cards 155. In both cases, using this information, card locating tool 130 can look up to which card user 105 missing card 155 belongs.

By using the mobile devices that people now routinely carry, in certain embodiments, card locating tool 130 is able to locate missing cards 155, equipped with transmitters 155A capable of broadcasting identifiers 165. When a user loses a registered card 155, he/she can send a notification 150 to card locating tool 130, which then adds the card's identifier 165 to a list of missing cards 145. When nearby phones receive the missing card's transmission containing its identifier 165, they send their global positioning system (GPS) locations to card locating tool 130, along with the identifier 165. Using the GPS locations it receives, card locating tool 130 determines a location or range of locations for the missing card 155, which it sends to the card user 105. In this manner, certain embodiments enable a card user 105 to locate a missing card 155.

Figure 2A:
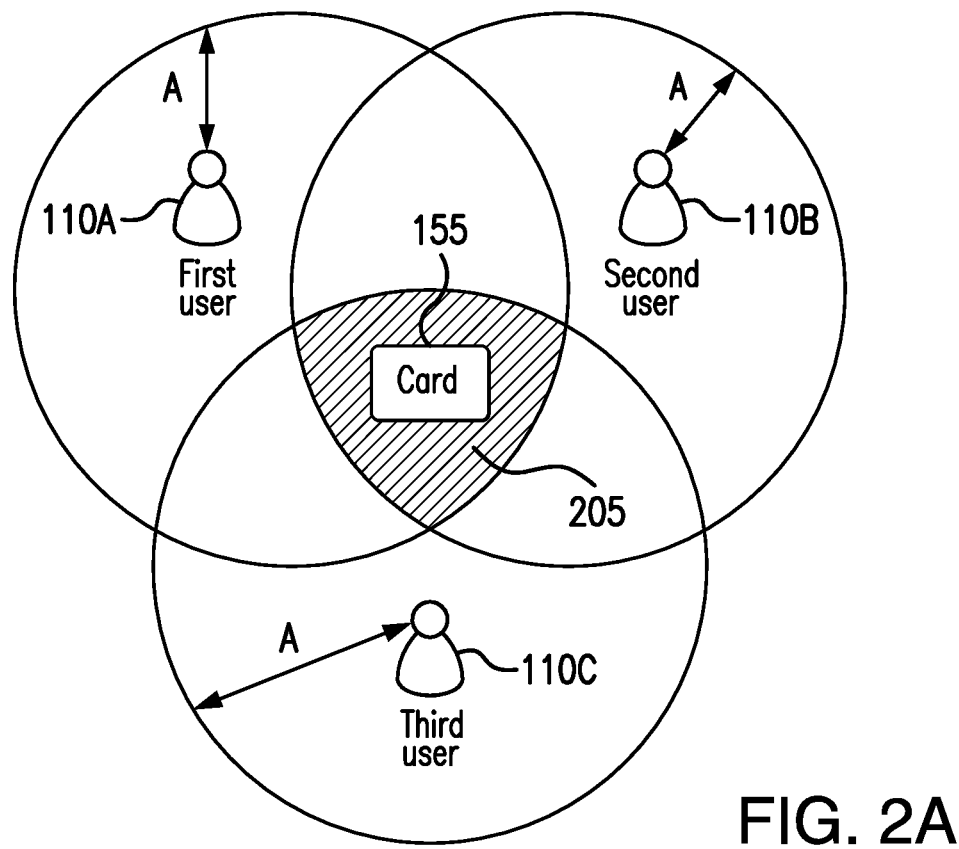
FIGS. 2A and 2B illustrate the methods by which the missing card locator component of the card locating tool in the system of FIG. 1 determines a missing card location using GPS locations from three mobile devices.
Figure 2B:
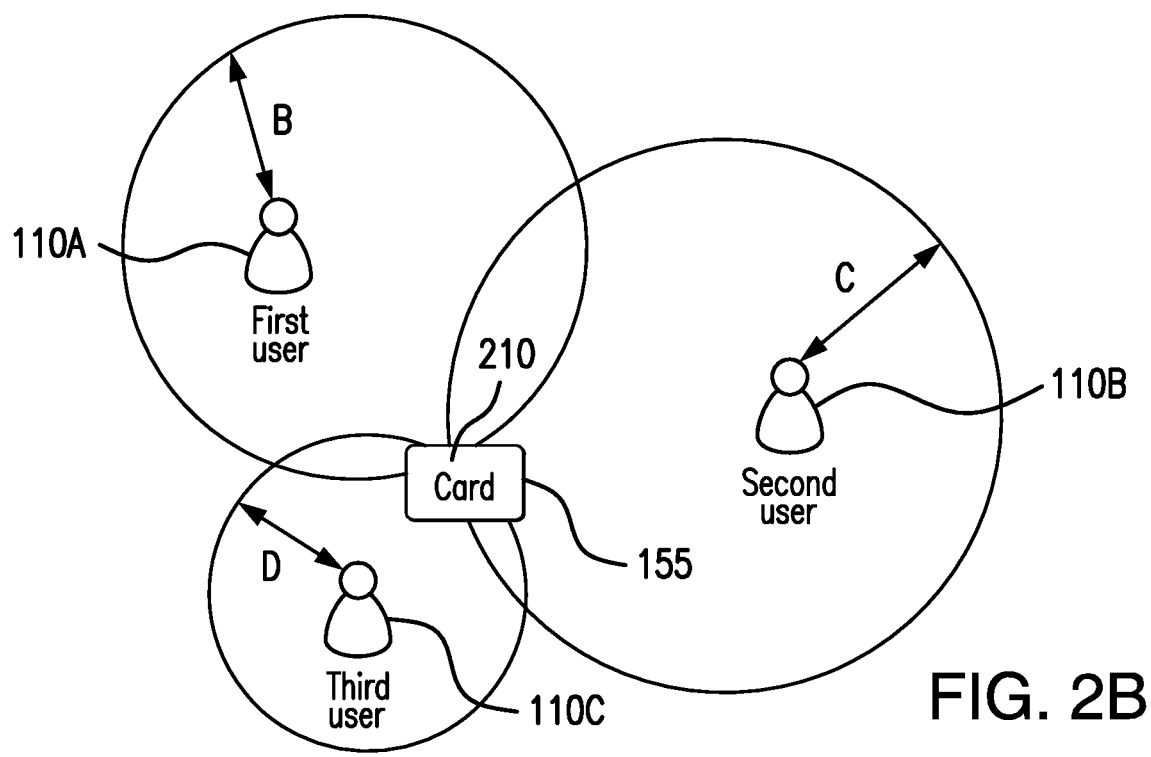

FIGS. 2A and 2B illustrate the methods by which missing card identification component 175 of card locating tool 130 determines a location 210 or range of locations 205 for missing card 155.

FIG. 2A illustrates the method for a system 100 in which first message 160A sent to card locating tool 130 from first mobile device 120A, second message 160B sent to card locating tool 130 from second mobile device 120B, and third message 160C sent to card locating tool 130 from third mobile device 120C, contain card identifier 165 and GPS locations (first location 170A for first mobile device 120A, second location 170B for second mobile device 120B, and third location 170C for third mobile device 120C), but not strengths of transmission 155B received by the mobile devices at their locations. Without knowledge of the strengths of transmission 155B received by the mobile devices at their locations, card locating tool 130 likely cannot determine a precise location for missing card 155. However, given that first mobile device 120A, second mobile device 120B, and third mobile device 120C can only receive transmissions 155B if they are located within a distance A (the range of the transmission) from missing card 155, card locating tool 130 can use first location 170A, second location 170B, and third location 170C to determine a range of possible locations 205 for missing card 155.

As seen in FIG. 2A, to determine the range of possible locations 205 for missing card 155, card locating tool 130 determines a circular region around each of first user 110A, second user 110B, and third user 110C, of radius A, Given that A corresponds to the farthest distance from first mobile device 120A, second mobile device 120B, and third mobile device 120C for which the mobile devices are able to receive transmission 155B, the circular region surrounding each of first user 110A, second user 110B, and third user 110C, corresponds to the range of possible locations of missing card 155. The intersection region 205 of these circular regions thus corresponds to the range of possible locations of missing card 155.

In certain embodiments, more than three enabled mobile devices including first mobile device 120A, second mobile device 120B, and third mobile device 120C receive transmission 155B. In such embodiments, the additional enabled mobile devices also send messages to card locating tool 130 containing card identifier 165 and their GPS locations. Card locating tool 130 then uses this additional information to narrow the range of possible locations 205 for missing card 155.

In certain embodiments, less than three enabled mobile devices receive transmission 155B from missing card 155. For example, only first mobile device 120A receives transmission 155B from missing card 155. In such case, card locating tool 130 sends fourth mobile device 115 the entire circular region with radius A surrounding first mobile device 120A as the range of possible locations for missing card 155.

FIG. 2B illustrates the methods by which missing card identification component 175 of card locating tool 130 determines a location 210 for missing card 155 in certain embodiments where first message 160A additionally contains a first strength of transmission 155B, second message 160B additionally contains a second strength of transmission 155B, and third message 160C additionally contains a third strength of transmission 155B. In such embodiments, card locating tool 130 uses the strengths of transmission 155B to determine the distances from each of first mobile device 120A, second mobile device 120B, and third mobile device 120C to missing card 155. For example, card locating tool 130 uses first strength of transmission 155B, measured by first mobile device 120A, to determine that missing card 155 is located a distance B from first user 110A, and that missing card 155 is therefore located somewhere along a first circle of radius B, centered on first user 110A. Card locating tool 130 further uses second strength of transmission 155B, measured by second mobile device 120B, to determine that missing card 155 is located a distance C from second user 110B, and that missing card 155 is therefore also located somewhere along a second circle of radius C, centered on second user 110B. Since first circle of radius B, centered on first user 110A, and second circle of radius C, centered on second user 110B, intersect at two points, this limits the possible locations for missing card 155 to these two points. Card location tool 130 additionally uses third strength of transmission 155B, measured by third mobile device 120C, to limit the location of missing card 155 to a single location 210; card locating tool 130 uses second strength of transmission 155B, measured by third mobile device 120C, to determine that missing card 155 is located a distance D from third user 110C, and that missing card 155 is therefore also located somewhere along a third circle of radius D, centered on third user 110C. Since first circle of radius B, centered on first user 110A, second circle of radius C, centered on second user 110B, and third circle of radius D, centered on third user 110C, intersect at a single location 210, card locating tool 130 sends location 210 to fourth mobile device 115, as the location for missing card 155.

In certain embodiments, if card locating tool 130 receives only first message 160A from first mobile device 120A, it sends fourth mobile device 115 the entire boundary of the circle of radius B surrounding first mobile device 120A as the range of possible locations for missing card 155. In further embodiments, if card locating tool 130 receives only first message 160A from first mobile device 120A and second message 160B from second mobile device 120B, it sends two possible locations—the intersection points of a first circle of radius B centered on first user 110A and a second circle of radius C centered on second user 110B—to fourth mobile device 115 as possible locations for missing card 155.

In certain embodiments, prior to using first location 170A, second location 170B, and third location 170C, card locating tool 130 first determines the times in which these locations were sent to it by the mobile devices. For example, card locating tool 130 determines that first mobile device 120A sent first message 160A containing first location 170A at a first time, second mobile device 120B sent second message 160B containing second location 170B at a second time, and third mobile device 120C sent third message 160C containing third location 170C at a third time. Card locating tool 130 then determines that a first difference between the first time and the second time is less than a set threshold, a second difference between the second time and the third time is less than the set threshold, and a third difference between the first time and the third time is less than the set threshold. Card locating tool 130 then determines the range of possible locations 205 or location 210 for missing card 155. This may be desirable when missing card 155 is moving, in which case first location 170A, second location 170B, and third location 170C likely will not provide accurate locations 210 or ranges of location 205, unless they are measured at approximately the same time.

Figure 3:
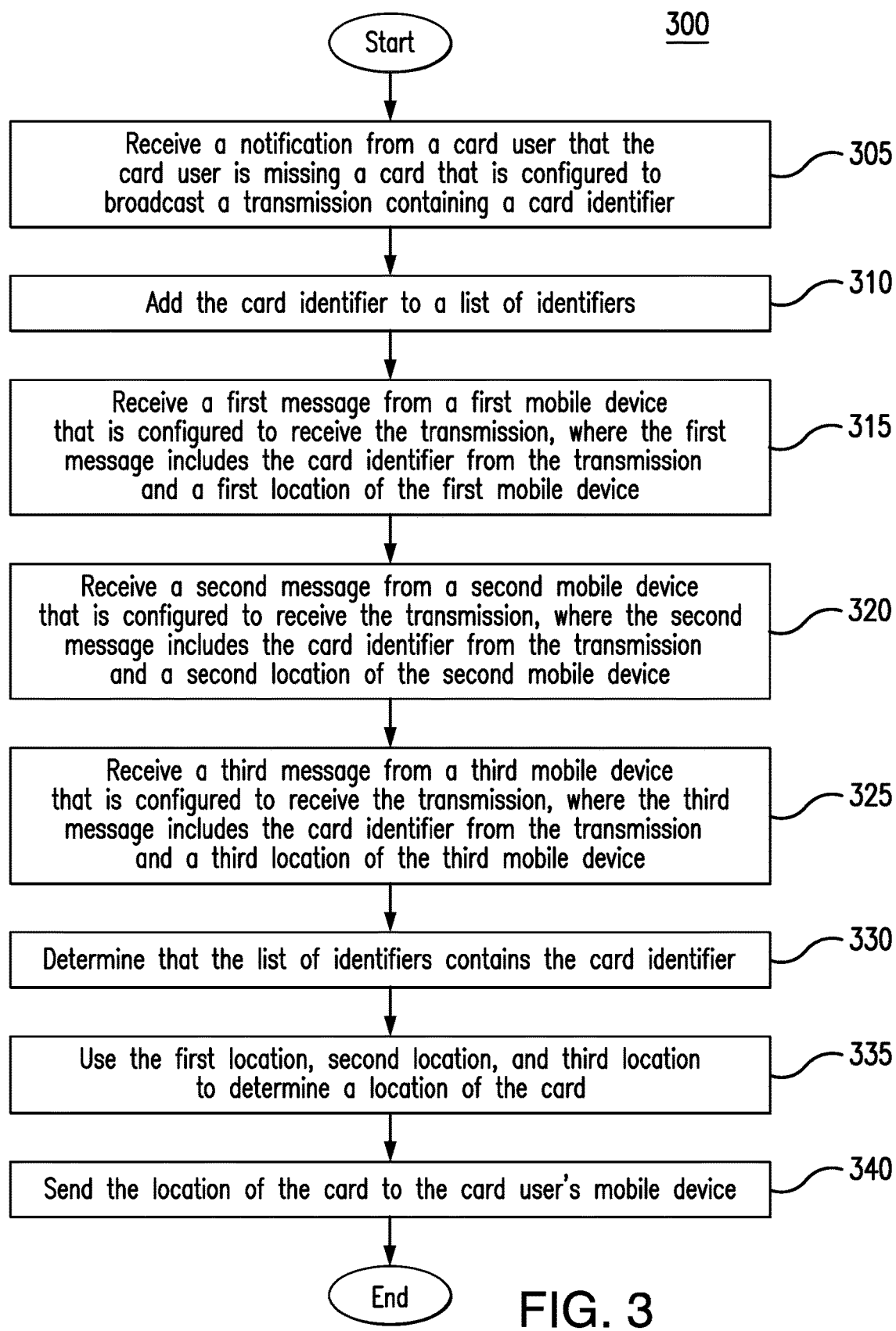
FIG. 3 presents a flowchart illustrating the process by which the card locating tool in the system of FIG. 1 locates a missing card.

FIG. 3 further illustrates the process by which card locating tool 130 determines a location 210 or range of locations 205 for missing card 155. In step 305, card locating tool 130 receives a notification 150 from a card user 105 indicating that card user 105 is missing his/her card 155. Card 155 is equipped with a transmitter 155A capable of broadcasting a transmission 155B consisting of a card identifier assigned to card 155.

This disclosure contemplates that transmitter 155A can be any type of electronic device, equipped with an antenna, and capable of generating transmission 155B. In certain embodiments, transmitter 155A is a radio-frequency identification (RFID) transmitter. In further embodiments, transmitter 155A is a Bluetooth transmitter. In certain embodiments, transmitter 155B is a passive transmitter, powered by electromagnetic waves generated externally of the transmitter. Such embodiments are described in further detail below, in the discussion of FIGS. 4A and 4B. In further embodiments, transmitter 155B is an active transmitter, powered by a power source within or coupled to transmitter 155B, such than transmitter 155B can produce transmission 155A automatically.

In step 310, card locating tool 130 adds the card identifier assigned to card 155 to a list of identifiers 145 stored in memory 140. In certain embodiments, for each identifier in the list of identifiers 145 memory 140 also stores the identity of card user 105. In further embodiments, memory 140 also stores a list of all card users 105 and the identifiers associated with their cards 155. In both cases, card locating tool 130 uses the additional stored information to look up to which card user 105 card 155 belongs, once card locating tool 130 has determined a location 210 or range of locations 205 for card 155. In this manner, card locating tool 130 can determine to which card user 105 to send found card notification 185.

In step 315, card locating tool 130 receives a first message 160A from a first mobile device 120A that is configured to receive transmissions 155B, where first message 160A includes card identifier 165 broadcasted by transmitter 155A in transmission 155B and a first location 170A of first mobile device 120A. In step 320, card locating tool 130 receives a second message 160B from a second mobile device 120B that is also configured to receive transmissions 155B, where second message 160B includes card identifier 165 broadcasted by transmitter 155A in transmission 155B and a second location 170B of second mobile device 120B. In step 325, card locating tool 130 receives a third message 160C from a third mobile device 120C that is also configured to receive transmissions 155B, where third message 160C includes card identifier 165 broadcasted by transmitter 155A in transmission 155B and a third location 170C of third mobile device 120C. In certain embodiments, first message 160A also includes a first strength of transmission 155B, second message 160B also includes a second strength of transmission 155B, and third message 160C also includes a third strength of transmission 155B.

In certain embodiments, after card locating tool 130 adds card identifier 165 assigned to card 155 to the list of identifiers 145, card locating tool 130 also transmits those card identifiers stored in the list of missing card identifiers 145 to enabled mobile devices including first mobile device 120A, second mobile device 120B, and third mobile device 120C. In such embodiments, when card locating tool 130 receives first message 160A, second message 160B, and third message 160C, each containing card identifier 165, card locating tool 130 performs missing card identification 175, to determine to which missing card identifier, stored in the list of missing card identifiers 145, card identifier 165 corresponds. By determining to which missing card identifier, stored in the list of missing card identifiers 145, card identifier 165 corresponds, card locating tool 130 is able to determine the card user 105 for whom missing card 155 has been located.

In certain embodiments, card locating tool 130 only transmits missing card identifiers, stored in the list of missing card identifiers 145, to those enabled mobile devices, including first mobile device 120A, second mobile device 120B, and third mobile device 120C, that are located in the same geographic region as card user 105 was located when he/she lost his/her card 155. In certain such embodiments, card locating tool 130 may increase the size of this geographic region if no enabled mobile devices located within the initial geographic region receive transmission 155B from missing card 155 within a set period of time. For example, the initial geographic region may consist of a circular region of radius one mile from where card user 105 lost his/her card 155. If no enabled mobile devices, such as first mobile device 120A, second mobile device 120B, and/or third mobile device 120C, located within this region, are able to detect transmission 155B from missing card 155 within fifteen minutes time, card locating tool may additionally send the identifier assigned to missing card 155 to all enabled mobile devices located within the same city as user 105 was located when user 105 lost his/her card 155. This may be desirable as it helps to conserve system resources, by only sending missing card identifiers to those mobile devices that are most likely within the transmission range of missing card 155.

In step 330, card locating tool 130 performs missing card identification 175 to determine that card identifier 165 is among the card identifiers in the list of card identifiers 145 stored in memory 140. In certain embodiments, missing card identification 175 additionally involves determining the card user 105 to whom missing card 155 belongs.

In step 335, card locating tool 130 uses first location 170A, second location 170B, and third location 170C to determine a location 210 or range of locations 205 for missing card 155. Card locating tool 130 may only determine a range of locations 205 for missing card 155 in those embodiments for which first message 160A, second message 160B, and third message 160C do not contain the strengths of transmission 155B measured by first mobile device 120A, second mobile device 120B, and third mobile device 120C. Card locating tool 130 is able to determine a location 210 for missing card 155 in those embodiments for which first message 160A additionally includes a first strength of transmission 155B at first location 170A, second message 160B additionally includes a second strength of transmission 155B at second location 170B, and third message 160C additionally includes a third strength of transmission 155B at third location 170C.

Finally, in step 340, card locating tool 130 sends the location 210 or range of locations 205 for missing card 155 to fourth mobile device 115 belonging to card user 105 in found card notification 185.

Modifications, additions, or omissions may be made to method 300 depicted in FIG. 3. Method 300 may include more, fewer, or other steps. For example, steps may be performed in parallel or in any suitable order. While discussed as card locating tool 130 (or components thereof) performing the steps, any suitable component of system 100, such as first mobile device(s) 120A, second mobile device(s) 120B, third mobile device(s) 120C, and/or fourth mobile device(s) 115, for example, may perform one or more steps of the method.

Figure 4A:
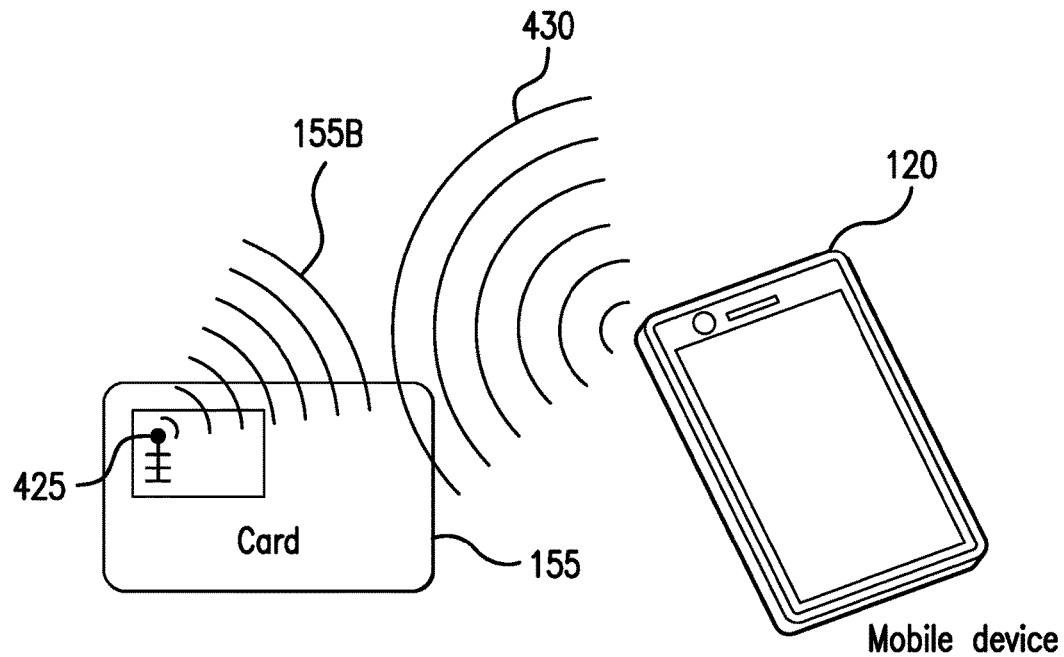
FIGS. 4A and 4B illustrate the method by which a missing card in the system of FIG. 1 produces a transmission containing an identifier assigned to the card.
Figure 4B:
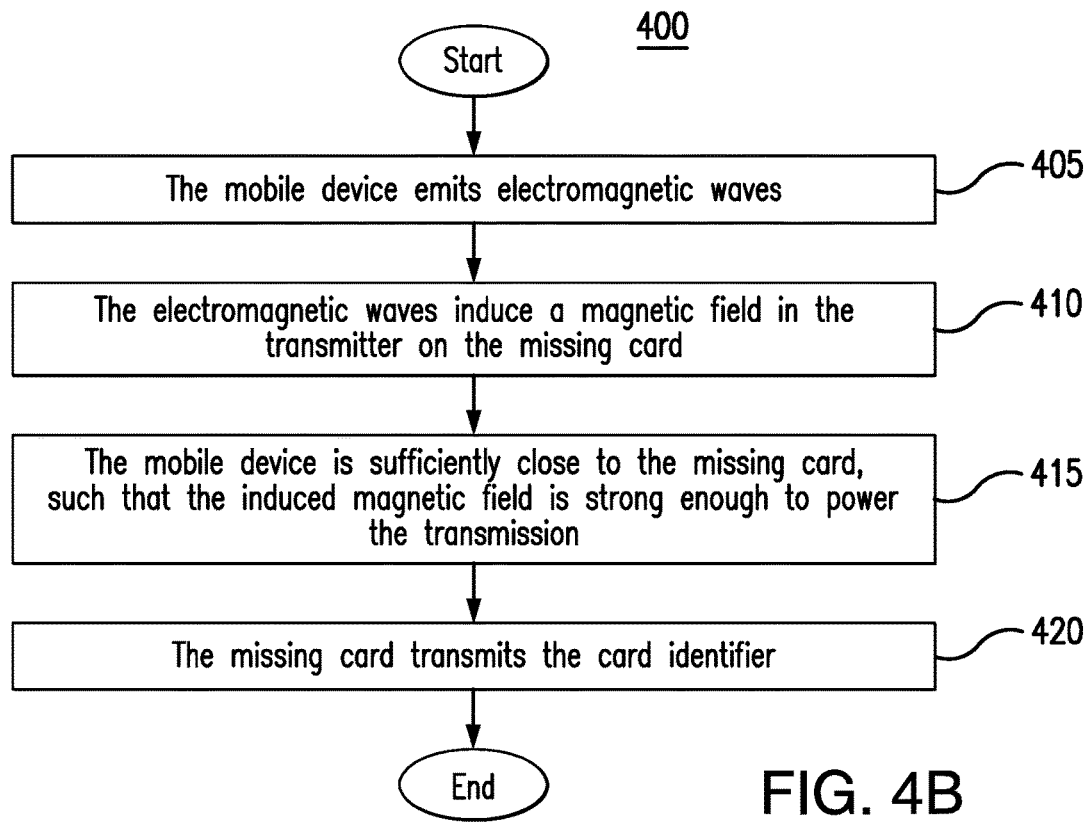

FIGS. 4A and 4B illustrate the method by which, in certain embodiments, a missing card 155 produces transmission 155 containing identifier 165. Such embodiments correspond to cards 155 equipped with passive transmitters 155A, powered by electromagnetic waves generated externally of the transmitter 155A. However, this disclosure also contemplates cards 155 equipped with active transmitters 155B, powered by a power source within or coupled to transmitters 155B, such than transmitters 155B can produce transmissions 155A automatically As seen in FIG. 4A, mobile device 120 generates electromagnetic waves 430. When mobile device 120 is within a certain range of missing card 155, electromagnetic waves 430 are able to induce a magnetic field in transmitter 155A of sufficient strength to power transmitter 155A, which then broadcasts transmission 155B using antenna 425.

FIG. 4B further illustrates this process. In step 405, mobile device 120 emits electromagnetic waves 120. In step 410, electromagnetic waves 430 induce a magnetic field in transmitter 155A of missing card 155. In step 415, mobile device 120 is sufficiently close to missing card 155, such that the induced magnetic field is strong enough to power transmission 155B. Finally, in step 420, missing card 155 broadcasts transmission 155B containing card identifier 165, using antenna 425.

Modifications, additions, or omissions may be made to method 400 depicted in FIG. 4. Method 400 may include more, fewer, or other steps. For example, steps may be performed in parallel or in any suitable order. While discussed as card locating tool 130 (or components thereof) performing the steps, any suitable component of system 100, such as first mobile device(s) 120A, second mobile device(s) 120B, third mobile device(s) 120C, and/or fourth mobile device(s) 115, for example, may perform one or more steps of the method.

Figure 5:
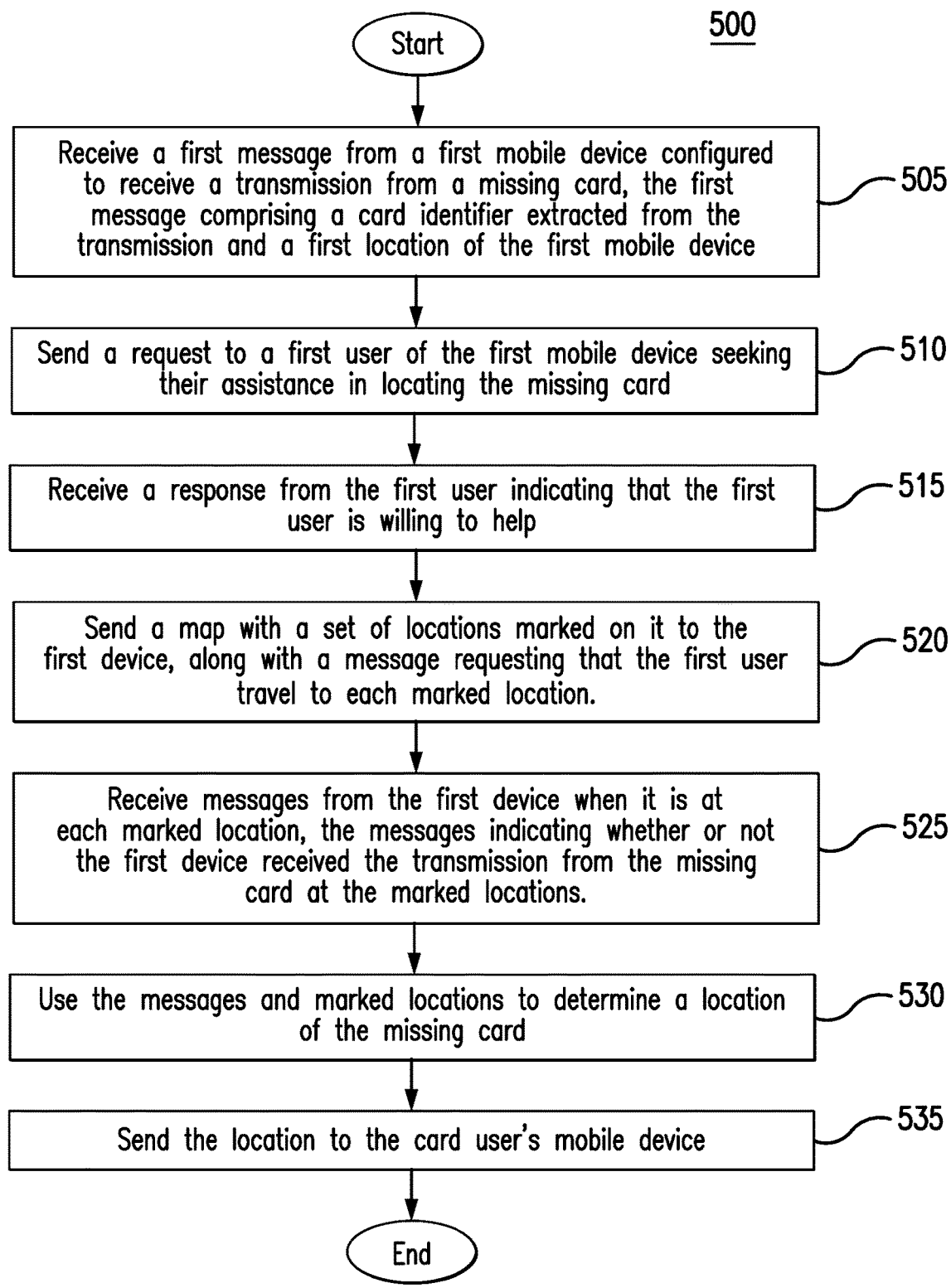
FIG. 5 presents a flowchart illustrating the process by which the card locating tool in the system of FIG. 1 is able to request and receive assistance in locating a missing card from a mobile device near the missing card.

FIG. 5 illustrates the process by which card locating tool 130 is able to request and receive assistance in locating a missing card 155, from a first mobile device 120A near missing card 155. In step 505, card locating tool 130 receives a first message 160A from a first mobile device 120A configured to receive a transmission 155B from a missing card 155, the first message 160A including a card identifier 165 extracted from transmission 155B and a first location 170A of first mobile device 120A. In step 510, card locating tool 130 sends a request to a first user 110A of first mobile device 120A seeking his/her assistance in locating missing card 155. In step 515, card locating tool 130 receives a response from first user 110A indicating that first user 110A is willing to help locate missing card 155. In step 520, missing card locator 130 sends a map with a set of locations marked on it to first mobile device 120A, along with a message requesting that first user 120A travel to each of the marked locations.

In step 525, card locating tool 130 receives messages from first mobile device 120A, when first mobile device 120A is located at each of the marked locations. These messages indicate whether or not first mobile device 120A received transmission 155B from missing card 155 at the marked locations. In step 530, card locating tool 130 uses these messages and the marked locations to determine a location 210 or range of locations 205 for missing card 155. Finally, in step 535, card locating tool 130 sends the location 210 or range of locations 205 for missing card 155 to fourth mobile device 115 belonging to card user 105.

This method may be desirable for those situations in which only one enabled mobile device (first mobile device 120A), receives transmission 155B from missing card 155. Rather than sending card user 105 the entire circular region of possible locations for missing card 155, card locating tool 130 can narrow the region of possible locations for missing card 155 with the assistance of first user 110A.

Modifications, additions, or omissions may be made to method 500 depicted in FIG. 5. Method 500 may include more, fewer, or other steps. For example, steps may be performed in parallel or in any suitable order. While discussed as card locating tool 130 (or components thereof) performing the steps, any suitable component of system 100, such as first mobile device(s) 120A, second mobile device(s) 120B, third mobile device(s) 120C, and/or fourth mobile device(s) 115, for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. An apparatus comprising:
a memory configured to store a list of identifiers; and
a hardware processor communicatively coupled to the memory, the hardware processor configured to:
receive a notification from a card user, the notification indicating that the card user is missing a card comprising a transmitter configured to broadcast a transmission comprising a card identifier;
add the card identifier to the list of identifiers;
receive a first message from a first mobile device that received the transmission, the first message comprising the card identifier from the transmission and a first location of the first mobile device;
receive a second message from a second mobile device that received the transmission, the second message comprising the card identifier from the transmission and a second location of the second mobile device;
receive a third message from a third mobile device that received the transmission, the third message comprising the card identifier from the transmission and a third location of the third mobile device;
in response to receiving the first message, the second message, and the third message:
determine that the list of identifiers contains the card identifier;
determine, based on the first location, the second location, and the third location, a location of the card; and
send the location of the card to a fourth mobile device of the card user.

2. The apparatus of claim 1, wherein:
the first mobile device, the second mobile device, and the third mobile device are configured to broadcast electromagnetic waves; and
the transmitter is further configured to broadcast the transmission when the transmitter is within a set distance from any of the first mobile device, the second mobile device, and the third mobile device, wherein the set distance is an outer extent of a range within which the electromagnetic waves broadcasted by any of the first mobile device, the second mobile device, and the third mobile device produce a magnetic field within the transmitter of a sufficient strength to power the transmission.

3. The apparatus of claim 1, wherein the first message further comprises a first strength of the transmission, the second message further comprises a second strength of the transmission, the third message further comprises a third strength of the transmission, and the determination of the location of the card is further based on the first strength, the second strength, and the third strength.

4. The apparatus of claim 1, wherein the hardware processor is further configured to:
determine, based on the first location and a known transmission range, a circular range of locations of the card; and
send the circular range to the fourth mobile device of the card user.

5. The apparatus of claim 1, wherein the hardware processor is further configured to:
determine that the first message was sent at a first time;
determine that the second message was sent at a second time;
determine that the third message was sent at a third time;
determine that a first difference between the first time and the second time is less than a set threshold;
determine that a second difference between the second time and the third time is less than the set threshold;
determine that a third difference between the first time and the third time is less than the set threshold; and
the determination, based on the first location, the second location, and the third location, of the location of the card is performed in response to determining that the first difference is less than the set threshold, the second difference is less than the threshold, and the third difference is less than the threshold.

6. The apparatus of claim 1, wherein the processor is further configured to send a request to a first user of the first mobile device seeking the first user's assistance in locating the card.

7. The apparatus of claim 6, wherein the hardware processor is further configured to:
receive a response from the first user of the first mobile device indicating the first user is willing to help locate the card; and
in response to receiving the response from the first user, send a map and a message to the first mobile device, the map comprising a set of locations, and the message requesting that the first user travel to each of the locations of the set of locations.

8. A method comprising:
receiving a notification from a card user, the notification indicating that the card user is missing a card comprising a transmitter configured to broadcast a transmission comprising a card identifier;
adding the card identifier to a list of identifiers stored in a memory;
receiving a first message from a first mobile device that received the transmission, the first message comprising the card identifier from the transmission and a first location of the first mobile device;

receiving a second message from a second mobile device that received the transmission, the second message comprising the card identifier from the transmission and a second location of the second mobile device;

receiving a third message from a third mobile device that received the transmission, the third message comprising the card identifier from the transmission and a third location of the third mobile device;

in response to receiving the first message, the second message, and the third message:
  determining that the list of identifiers contains the card identifier;
  determining, based on the first location, the second location, and the third location, a location of the card; and
  sending the location of the card to a fourth mobile device of the card user.

9. The method of claim 8, wherein:
the first mobile device, the second mobile device, and the third mobile device are configured to broadcast electromagnetic waves; and
the transmitter is further configured to broadcast the transmission when the transmitter is within a set distance from any of the first mobile device, the second mobile device, and the third mobile device, wherein the set distance is an outer extent of a range within which the electromagnetic waves broadcasted by any of the first mobile device, the second mobile device, and the third mobile device produce a magnetic field within the transmitter of a sufficient strength to power the transmission.

10. The method of claim 8, wherein the first message further comprises a first strength of the transmission, the second message further comprises a second strength of the transmission, the third message further comprises a third strength of the transmission, and the determination of the location of the card is further based on the first strength, the second strength, and the third strength.

11. The method of claim 8, further comprising:
determining, based on the first location and a known transmission range, a circular range of locations of the card; and
sending the circular range to the fourth mobile device of the card user.

12. The method of claim 8, further comprising:
determining that the first message was sent at a first time;
determining that the second message was sent at a second time;
determining that the third message was sent at a third time;
determining that a first difference between the first time and the second time is less than a set threshold;
determining that a second difference between the second time and the third time is less than the set threshold;
determining that a third difference between the first time and the third time is less than the set threshold; and
the process of determining, based on the first location, the second location, and the third location, the location of the card is performed in response to determining that the first difference is less than the set threshold, the second difference is less than the threshold, and the third difference is less than the threshold.

13. The method of claim 8, further comprising sending a request to a first user of the first mobile device seeking the first user's assistance in locating the card.

14. The method of claim 13, further comprising:
receiving a response from the first user of the first mobile device indicating the first user is willing to help locate the card; and
in response to receiving the response from the first user, sending a map and a message to the first mobile device, the map comprising a set of locations, and the message requesting that the first user travel to each of the locations of the set of locations.

15. A system comprising:
a storage element operable to store a list of identifiers; and
a processing element communicatively coupled to the storage element, the processing element operable to:
  receive a notification from a card user, the notification indicating that the card user is missing a card comprising a transmitter configured to broadcast a transmission comprising a card identifier;
  add the card identifier to the list of identifiers;
  receive a first message from a first mobile device that received the transmission, the first message comprising the card identifier from the transmission, a first strength of the transmission, and a first location of the first mobile device;
  receive a second message from a second mobile device that received the transmission, the second message comprising the card identifier from the transmission, a second strength of the transmission, and a second location of the second mobile device;
  receive a third message from a third mobile device that received the transmission, the third message comprising the card identifier from the transmission, a third strength of the transmission, and a third location of the third mobile device;
  in response to receiving the first message, the second message, and the third message:
    determine that the list of identifiers contains the card identifier;
    determine, based on the first location, the second location, the third location, the first strength, the second strength, and the third strength, a location of the card; and
    send the location of the card to a fourth mobile device of the card user.

16. The system of claim 15, wherein:
the first mobile device, the second mobile device, and the third mobile device are configured to broadcast electromagnetic waves; and
the transmitter is further configured to broadcast the transmission when the transmitter is within a set distance from any of the first mobile device, the second mobile device, and the third mobile device, wherein the set distance is an outer extent of a range within which the electromagnetic waves broadcasted by any of the first mobile device, the second mobile device, and the third mobile device produce a magnetic field within the transmitter of a sufficient strength to power the transmission.

17. The system of claim 15, wherein the processing element is further operable to:
determine, based on the first location and a known transmission range, a circular range of locations of the card; and
send the circular range to the fourth mobile device of the card user.

18. The system of claim 15, wherein the processing element is further operable to:
determine that the first message was sent at a first time;

determine that the second message was sent at a second time;
determine that the third message was sent at a third time;
determine that a first difference between the first time and the second time is less than a set threshold;
determine that a second difference between the second time and the third time is less than the set threshold;
determine that a third difference between the first time and the third time is less than the set threshold; and
the determination, based on the first location, the second location, and the third location, of the location of the card is performed in response to determining that the first difference is less than the set threshold, the second difference is less than the threshold, and the third difference is less than the threshold.

19. The system of claim 15, wherein the processing element is further operable to send a request to a first user of the first mobile device seeking the first user's assistance in locating the card.

20. The system of claim 19, wherein the processing element is further operable to:
receive a response from the first user of the first mobile device indicating the first user is willing to help locate the card; and
in response to receiving the response from the first user, send a map and a message to the first mobile device, the map comprising a set of locations, and the message requesting that the first user travel to each of the locations of the set of locations.

* * * * *